(12) United States Patent
Otani et al.

(10) Patent No.: US 8,218,131 B2
(45) Date of Patent: Jul. 10, 2012

(54) POSITION MEASURING SYSTEM, POSITION MEASURING METHOD AND POSITION MEASURING PROGRAM

(75) Inventors: Hitoshi Otani, Itabashi-ku (JP); Tadayuki Ito, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 1313 days.

(21) Appl. No.: 11/891,382

(22) Filed: Aug. 10, 2007

(65) Prior Publication Data
US 2008/0075325 A1  Mar. 27, 2008

(30) Foreign Application Priority Data
Sep. 22, 2006  (JP) .................................. 2006-257712

(51) Int. Cl.
*G01C 3/08* (2006.01)

(52) U.S. Cl. ......... 356/4.01; 356/4.1; 356/5.01; 356/5.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | | |
|---|---|---|---|---|
| 2003/0137449 A1 * | 7/2003 | Vashisth et al. | .......... | 342/357.08 |
| 2005/0213808 A1 | 9/2005 | Ohtomo et al. | ................ | 382/154 |
| 2006/0188143 A1 | 8/2006 | Strassenburg-Kleciak | ... | 382/154 |

FOREIGN PATENT DOCUMENTS

| | | |
|---|---|---|
| JP | 6-214027 A | 8/1994 |
| JP | 2002-31528 A | 1/2002 |
| JP | 2004-37127 A | 2/2004 |
| JP | 2004-37396 A | 2/2004 |
| JP | 2004-163292 | 6/2004 |
| JP | 2004-317237 A | 11/2004 |
| JP | 2004-361315 A | 12/2004 |
| JP | 2005-283221 | 10/2005 |
| JP | 2008-76303 A | 4/2008 |
| WO | 97/40342 | 10/1997 |

OTHER PUBLICATIONS

European communication dated Jul. 3, 2009.
Japanese Communication, with English translation, mailed Nov. 29, 2011 in corresponding Japanese Patent Application No. 2006-257712.
European Communication mailed Mar. 14, 2012 in corresponding European Patent Application No. 07018456.9.

* cited by examiner

*Primary Examiner* — Luke Ratcliffe
(74) *Attorney, Agent, or Firm* — Nields, Lemack & Frame, LLC

(57) ABSTRACT

A position measuring system, comprising a distance measuring unit for projecting and scanning a pulsed beam for measurement to a measurement area and for measuring a distance based on a reflected light of the pulsed beam for measurement and for obtaining a position data group in the measurement area, a digital image pickup unit for acquiring an image data by taking an image of the measurement area, a storage unit for storing at least two sets of the position data groups and the image data acquired from at least two directions by interrelating and associating the position data groups with the image data, and an arithmetic unit for synthesizing the at least two position data groups through matching of the two images based on the two stored image data.

10 Claims, 14 Drawing Sheets

FIG.11 (A)
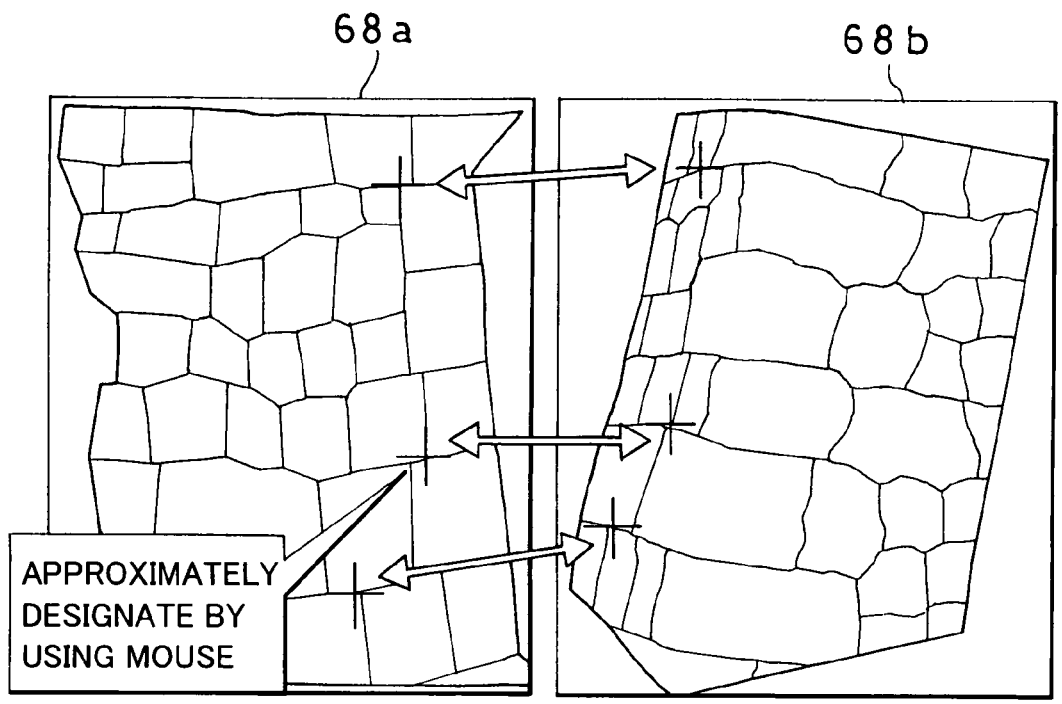
FIG.11 (B)
FIG.12 (A)
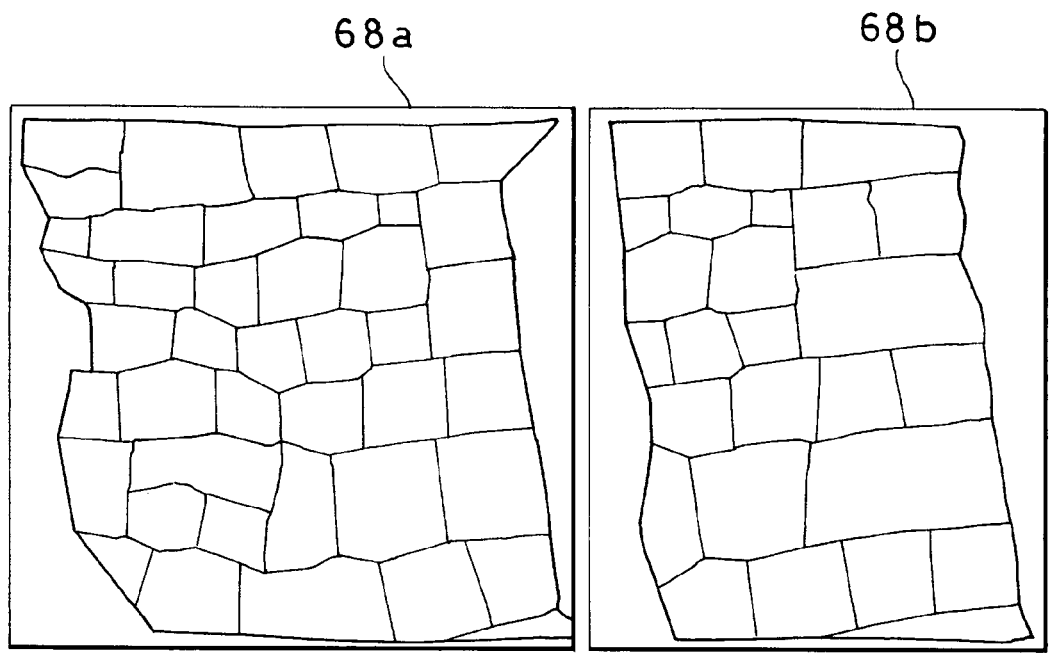
FIG.12 (B)

FIG.13 (A) FIG.13 (B)
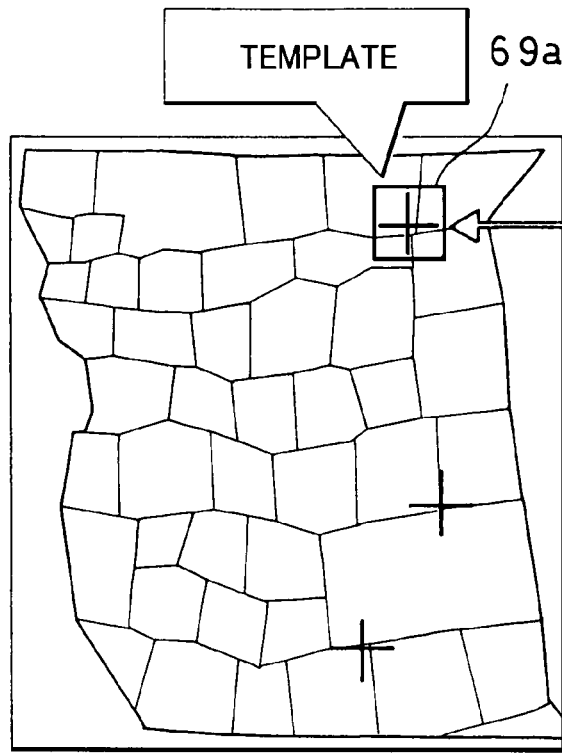
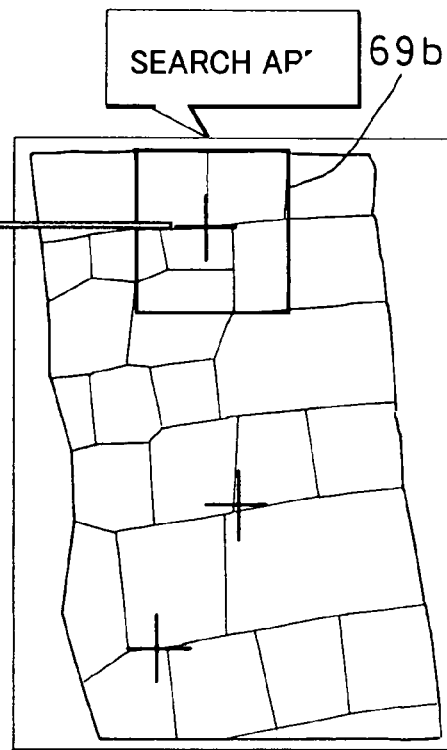
FIG.14 (A) FIG.14 (B)
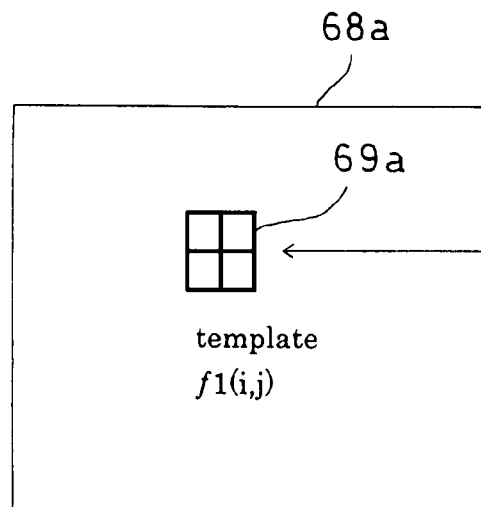
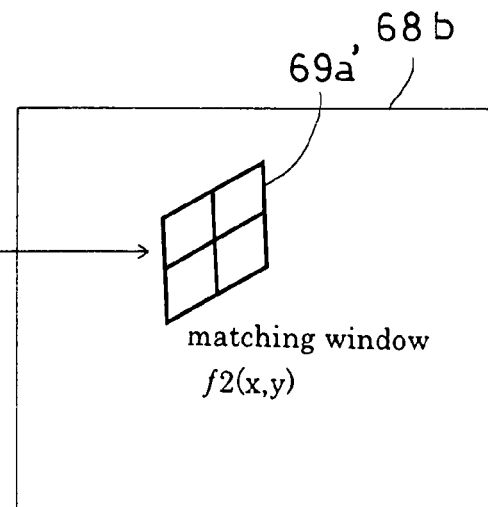

POSITION MEASURING SYSTEM, POSITION MEASURING METHOD AND POSITION MEASURING PROGRAM

BACKGROUND OF THE INVENTION

The present invention relates to a position measuring system, a position measuring method, and a position measuring program for preparing positional data with an image of a predetermined measurement area.

A three-dimensional measuring system, i.e. a so-called laser scanner, has been known in the past. According to this three-dimensional measuring system, a pulsed beam for measurement is projected to an object to be measured for scanning, and a distance is measured according to a light reflected from the object to be measured. Three-dimensional measurement of the object to be measured is conducted according to a value of the measured distance and a value of a projection angle of the light, and position data is obtained. In this type of three-dimensional measuring system, three-dimensional point group data is obtained by calculating based on the measured distance value and the projection angle of the light. A type of measuring system is known, by which image data of the object to be measured is also obtained at the same time to acquire three-dimensional data with an image by synthesizing the image data with the point group data.

On the other hand, in this type of measuring system, the object to be measured is a three-dimensional object, and it is unavoidable that there is an area, which cannot be measured by the measurement from a single point. For this reason, it has been performed that the measurement with no defects can be attained by measuring point group data on the object to be measured from a plurality of points in different directions and by synthesizing a plurality of point group data thus measured on the same coordinates. In this respect, in the method for synthesizing the point group data in the prior art, a target for the purpose of synthesis is installed on the object to be measured, and by measuring this target with high accuracy, coordinate transformation is performed based on the result of measurement on the target. Or, another method is known, in which three or more points common to two point group data are set up, and coordinate transformation is performed. After approximate position alignment, the distance between two point group data is turned to the minimum.

According to the prior art, however, a target must be installed on the object to be measured, and this means that complicated procedure is required for the installation of the target. Also, it is difficult to install the target when the object to be measured is located at high position. In the case where the target is not installed, synthesis must be made by merely depending on the shape of the point group data, and this means that the object to be measured must have special characteristics such as irregular surfaces or the like. There has been such problems that the characteristics such as irregular surfaces or the like may exert detrimental influence on the accuracy of the synthesis.

SUMMARY OF THE INVENTION

It is an object of the invention to provide a position measuring system, which can eliminate the defects in the prior art as described above.

To attain the above object, the present invention provides a position measuring system, which comprises a distance measuring unit for projecting and scanning a pulsed beam for measurement to a measurement area and for measuring a distance based on a reflected light of the pulsed beam for measurement and for obtaining a position data group in the measurement area, a digital image pickup unit for acquiring an image data by taking an image of the measurement area, a storage unit for storing at least two sets of the position data groups and the image data acquired from at least two directions by interrelating and associating the position data groups with the image data, and an arithmetic unit for synthesizing the at least two position data groups through matching of the two images based on the two stored image data. Also, the present invention provides the position measuring system as described above, which further comprises a sight, wherein the arithmetic unit sets up the measurement area by using the sight, wherein in the case where the measurement area extends beyond a range of a single image pickup, the arithmetic unit calculates a dividing aspect, picks up divided images two or more times, synthesizes the divided images, and obtains an image of the measurement area. Further, the present invention provides the position measuring system as described above, wherein the arithmetic unit prepares polygonal meshes from the position data group, and the polygonal meshes are interrelated and matched with the image data. Also, the present invention provides the position measuring system as described above, wherein the arithmetic unit approximately sets up at least three points or more common to the two image data, and, after performing coordinate transformation on one of the images with reference to the three points or more, matching is performed on the two images, and coordinate transformation is further conducted by using the coordinates obtained by the image matching. Further, the present invention provides the position measuring system as described above, wherein the arithmetic unit approximately sets up three points or more common to the two image data, sets up a template for an area as required including common points in one of the images, sets up a search area which is larger than the template in the other of the images so that the common points are included, and performs image matching by least squares matching method on the images of the template and the image of the search area. Also, the present invention provides the position measuring system as described above, wherein the arithmetic unit sets up at least three points or more common to the position data groups when two or more position data groups are to be synthesized, performs coordinate transformation by using all of the position data groups with reference to the points, and adjusts the synthesis of total position data groups.

Also, the present invention provides a position measuring method, which comprises a first step of projecting and scanning a pulsed beam for measurement to a measurement area and obtaining a position data group in the measurement area by performing distance measurement based on a reflected light of the pulsed beam for measurement, a second step of taking an image of the measurement area and acquiring an image data, a third step of storing at least two sets of the position data groups and the image data acquired from at least two directions by interrelating and matching the position data groups with the image data, and a fourth step of synthesizing the two image data groups through matching of two images based on the stored two image data. Further, the present invention provides the position measuring method as described above, wherein polygonal meshes are prepared from the position data group for the interrelating and the matching of the position data group with the image data, and the polygonal meshes are interrelated and matched with the image data. Also, the present invention provides the position measuring method as described above, which further comprises a step of approximately setting up at least three points or more common to the two image data, and, after performing coordinate transformation of one of the images with reference to the three points or more, performing the matching of the two images, and conducting coordinate transformation further by the coordinates obtained by the image matching. Further, the present invention provides the position measuring method as described above, which further comprises a step of approximately setting up three points or more common to the two image data for the matching, setting a template of an area as required including the common points in one of the images, setting up a search area larger than the template including the common points in the other of the images, and performing image matching by least squares matching method on the image of the template and on the image of the search area. Also, the present invention provides the position measuring method as described above, wherein, in the coordinate transformation, when two or more position data groups are to be synthesized, at least three points or more common to the position data groups are set up, coordinate transformation is performed by using all position data groups with reference to the points, and synthesis of total position data groups is adjusted.

Further, the invention provides a position measuring program for executing a step of projecting and scanning a pulsed beam for measurement to a measurement area, a step of measuring a distance based on a reflected light of the pulsed beam for measurement, a step of obtaining position data group on the measurement area, a step of acquiring image data by taking an image of the measurement area, a step of storing at least two sets of the position data group and the image data acquired from at least two directions by interrelating and associating the position data group with the image data, and a step of synthesizing two position data groups through matching of two images based on two stored image data. Further, the present invention provides the position measuring program as described above, wherein polygonal meshes are prepared from the position data group for the interrelating and the matching of the position data groups with the image data, and the polygonal meshes are interrelated and matched with the image data. Also, the present invention provides the position measuring program as described above, wherein at least three points or more common to the two image data are approximately set up, and, after performing coordinate transformation on one of the images with reference to the three points or more, matching is performed on said two images, and coordinate transformation is further executed by the coordinates obtained by the image matching. Further, the present invention provides the position measuring program as described above, wherein three points or more common to the two image data are approximately set up for the matching, a template of an area as required including the common points in one of the images, a search area larger than the template including the common points is set up in the other of the images, and image matching by least squares matching method is performed on the image of the template and on the image of the search area. Also, the present invention provides the position measuring program as described above, wherein at least three or more points common to the position data groups are set up in the coordinates transformation when two or more position data groups are to be synthesized, and coordinate transformation is performed by using all of the position data groups with reference to the points, and synthesis of total position data groups is adjusted.

According to the present invention, there are provided a distance measuring unit for projecting and scanning a pulsed beam for measurement to a measurement area and for measuring a distance based on a reflected light of the pulsed beam for measurement and for obtaining a position data group in the measurement area, a digital image pickup unit for acquiring an image data by taking an image of the measurement area, a storage unit for storing at least two sets of the position data groups and the image data acquired from at least two directions through matching of the position data groups with the image data, and an arithmetic unit for synthesizing the at least two position data groups through matching of the two images based on the two stored image data. As a result, the matching of two position data groups with respect to the measurement area can be easily performed without installing the target.

Also, according to the present invention, there are provided a first step of projecting and scanning a pulsed beam for measurement to a measurement area and obtaining a position data group in the measurement area by performing distance measurement based on a reflected light of the pulsed beam for measurement, a second step of taking an image of the measurement area and acquiring an image data, a third step of storing at least two sets of the position data groups and the image data acquired from at least two directions through matching of the position data groups and the image data, and a fourth step of synthesizing the two image data groups through matching of two images based on the stored two image data. As a result, the matching of two position data groups with respect to the measurement area can be easily performed without installing the target.

Also, according to the present invention, a position measuring program executes a step of projecting and scanning a pulsed beam for measurement to a measurement area, a step of measuring a distance based on a reflected light of the pulsed beam for measurement, a step of obtaining position data group on the measurement area, a step of acquiring image data by taking an image of the measurement area, a step of storing at least two sets of the position data group and the image data acquired from at least two directions by interrelating and associating the position data group with the image data, and a step of synthesizing two position data groups through matching of two images based on the two stored image data. As a result, the matching of two position data groups with respect to the measurement area can be easily performed without installing the target.

Also, according to the present invention, polygonal meshes are prepared from the position data group for the matching of the position data groups and the image data, and matching is made between the polygonal meshes and the image data. As a result, the procedure of the matching of all of the position data groups and the image data can not be performed, and this makes it possible to reduce the amount of the processing data, to save the storage capacity for the data to be stored, and this contributes to the improvement of the processing speed.

Further, according to the present invention, at least three points or more common to the two image data are approximately set up, and, after performing coordinate transformation on one of the images with reference to the three points or more, matching is performed on said two images, and coordinate transformation is further executed by the coordinates obtained by the image matching. This makes it possible to perform the synthesis of position data in easier manner.

Also, according to the present invention, three points or more common to the two image data are approximately set up for the matching, a template of an area as required including the common points is set up in one of the images, a search area larger than the template including the common points is set up in the other of the images, and image matching by least squares matching method is performed on the image of the template and on the image of the search area. As a result, the accuracy of the matching can be improved.

Further, according to the present invention, at least three or more points common to the position data groups are set up for the coordinates transformation when two or more position data groups are to be synthesized, and coordinate transformation is performed by using all of the position data groups with reference to the points, and synthesis of total position data groups is adjusted. As a result, the synthesis of two or more position data groups can be performed in easier manner and with higher accuracy.

BRIEF DESCRIPTION OF THE DRAWINGS

FIG. 11(A) and FIG. 11(B) each represents a drawing of an example of an image to be displayed on the display unit;

FIG. 12(A) and FIG. 12(B) each represents a drawing of an example of an image to be displayed on the display unit;

FIG. 13(A) and FIG. 13(B) each represents a drawing of an example of an image to be displayed on the display unit;

FIG. 14(A) and FIG. 14(B) each represents a drawing of least squares matching;

DETAILED DESCRIPTION OF THE PREFERRED EMBODIMENTS

Description will be given below on the best mode when the present invention is carried out by referring to the attached drawings.

As a position measuring system used in the present invention, a laser scanner is used, for instance.

A laser scanner is a type of a position measuring system, by which it is possible to perform three-dimensional position measurement on a multiple of points in a wide range within short time. For instance, a laser scanner is a position measuring system to perform three-dimensional measurement on a multiple of points by projecting a pulsed laser beam to scan over a measurement range.

First, description will be given on a position measuring system, in which the present invention is applied.

Figure 1:
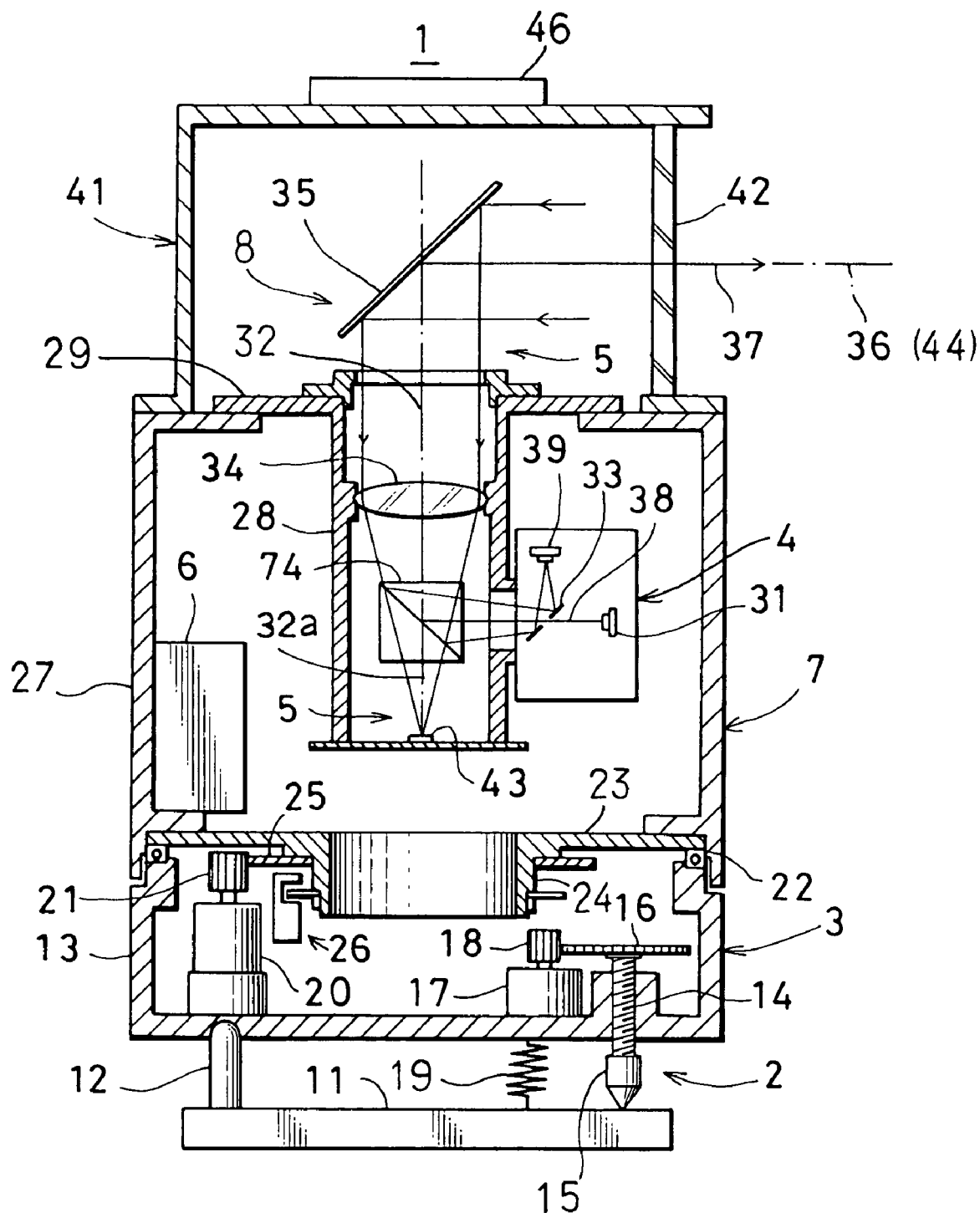
FIG. 1 is a cross-sectional view of a position measuring system according to a first embodiment of the invention.
Figure 2:
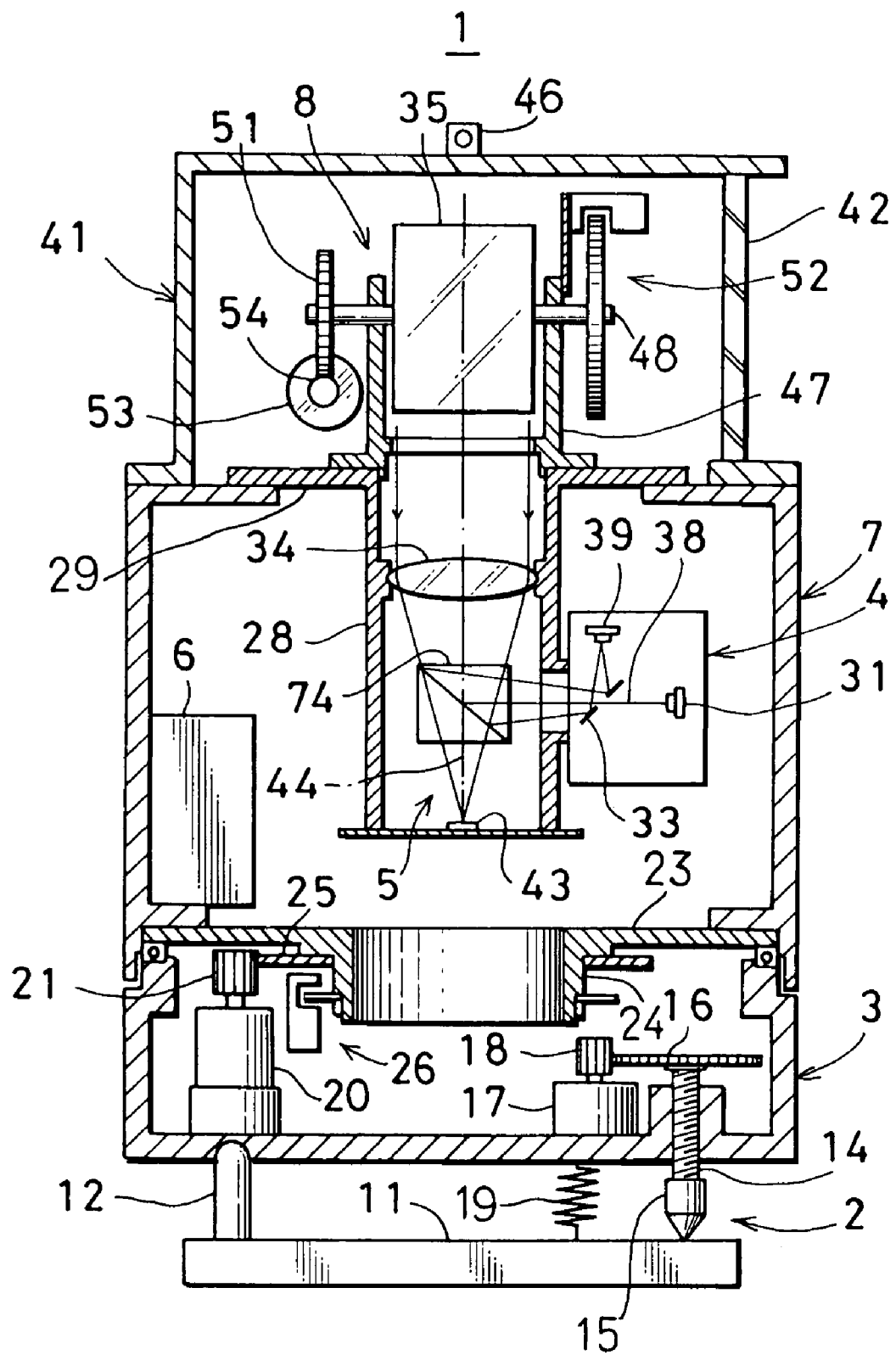
FIG. 2 is a cross-sectional view of the position measuring system according to the first embodiment of the invention with a part of the system being rotated.

FIG. 1 and FIG. 2 each represents a position measuring system in a first embodiment of the invention.

A position measuring system 1 primarily comprises a leveling unit 2, a rotary mechanism 3 installed on the leveling unit 2, a measuring system main unit 7 supported by the rotary mechanism 3 and including a distance measuring unit 4, an image pickup unit 5, a control unit 6, etc., and a rotary projecting unit 8 mounted on an upper portion of the measuring system main unit 7. For convenience purpose, FIG. 2 shows the condition of the system when only the rotary projecting unit 8 is seen from a lateral direction with respect to FIG. 1.

Now, description will be given on the leveling unit 2.

A pin 12 is erected on a base unit 11. An upper end of the pin 12 is designed with a curved surface and is tiltably engaged in a depression portion on a bottom surface of a lower casing 13. At two other points on the bottom surface, adjusting screws 14 are screwed in and are penetrating through. On a lower end of each of the adjusting screws 14, a leg member 15 is fixed. The lower end of the leg member 15 is formed with a pointed end or with a curved surface and is abutted to the base unit 11. On an upper end of the adjusting screw 14, a leveling driven gear 16 is engaged. The lower casing 13 is supported on the base unit 11 at three points by the pin 12 and by the two adjusting screws 14 so that the lower casing 13 can be tilted in any direction around the tip of the pin 12. A spring 19 is provided between the base unit 11 and the lower casing 13 so that the base unit 11 and the lower casing 13 are not separated from each other.

Inside the lower casing 13, two leveling motors 17 are disposed, and a leveling driving gear 18 is engaged with an output shaft of the leveling motor 17, and the leveling driving gear 18 is engaged with the leveling driven gear 16. The leveling motor 17 is driven independently by the control unit 6. By the driving of the leveling motor 17, the adjusting screws 14 are rotated via the leveling driving gear 18 and the leveling driven gear 16 so that the extent of the projection of the adjusting screw 14 in a downward direction can be adjusted. Also, inside the lower casing 13, a tilt sensor 56 (see FIG. 3) is mounted. The two leveling motors 17 are driven according to a detection signal from the tilt sensor 56, and leveling by the leveling unit 2 can be performed.

Description will be given now on the rotary mechanism 3.

The lower casing 13 also serves as a casing for the rotary mechanism 3. A horizontal rotating motor 20 is mounted in the lower casing 13, and a horizontal rotary driving gear 21 is mounted on an output shaft of the horizontal rotating motor 20.

The upper end of the lower casing 13 is designed in cylindrical shape. A rotary base 23 is provided on this upper end via bearings 22. A rotation axis 24 projecting downward is arranged at the center of the rotary base 23. A horizontal rotary driving gear 25 is provided on the rotation axis 24, and the horizontal rotary driving gear 21 is engaged with the horizontal rotary gear 25.

On the rotation axis 24, a horizontal angle detector 26, e.g. an encoder, is disposed. By the horizontal angle detector 26, a relative rotation angle of the rotation axis 24 with respect to the lower casing 13 is detected. The results of the detection (horizontal angle) is inputted to the control unit 6. The driving of the horizontal rotating motor 20 is controlled by the control unit 6 based on the detection results.

Next, description will be given on the measuring system main unit 7.

A main unit casing 27 is fixed on the rotary base 23, and a body tube (lens barrel) 28 is disposed in the main unit casing 27. The body tube 28 has a centerline, which is coaxial with the rotation center of the main unit casing 27, and the body tube 28 is mounted on the main unit casing 27 by means as necessary. For instance, a flange 29 is formed on an upper end of the body tube 28, and the flange 29 is fixed on a ceiling of the main unit casing 27.

The body tube 28 has an emission light optical axis 32, which concurs with the central axis of the body tube 28, and a beam splitter 74, serving as an optical separating means, is provided on the emission light optical axis 32. The beam splitter 74 allows visible light to pass and reflects infrared light. A reflection light optical axis 38 is separated from the emission light optical axis 32 by the beam splitter 74.

The distance measuring unit 4 is arranged on the reflection light optical axis 38.

A light emitting element 31 is disposed on the reflection light optical axis 38, and an aperture mirror 33 is provided on the reflection light optical axis 38. The aperture mirror 33 branches off the reflection light optical axis 38, and a distance measuring light receiving unit 39 is disposed on the branched optical axis.

From the light emitting element 31, a pulsed laser beam is emitted. The light emitting element 31 is a semiconductor laser or the like, for instance. The light emitting element 31 emits a pulsed laser beam of infrared light as a distance measuring light 37, and the light emitting element 31 is controlled by the control unit 6 so that the pulsed laser beam is emitted under the condition as required. The pulsed laser beam passes through the aperture mirror 33 and is reflected toward an elevation rotary mirror 35 by the beam splitter 74. Then, the pulsed laser beam is projected to an object to be measured via the elevation rotary mirror 35. The elevation rotary mirror 35 is a deflecting optical member and is disposed on the emission light optical axis 32, and a condenser lens 34 is arranged on the emission light optical axis 32. The elevation rotary mirror 35 deflects the emission light optical axis 32, which runs in a vertical direction, to a projection light optical axis 36 running in a horizontal direction.

A reflected distance measuring light reflected from the object to be measured enters the distance measuring light receiving unit 39 via the elevation rotary mirror 35 and the aperture mirror 33. It is so designed that a divided part of the split distance measuring light 37 enters the distance measuring light receiving unit 39 as an internal reference light (not shown), and a distance to the object to be measured is determined based on the reflected distance measuring light and the internal reference light.

The light emitting element 31, the aperture mirror 33, the condenser lens 34, the elevation rotary mirror 35, the reflection light optical axis 38, etc. make up together the distance measuring unit 4.

An image receiving unit 43 is disposed on a transmission light optical axis 32*a* where the emission light optical axis 32 passes through the beam splitter 74, and the image receiving unit 43 is positioned at the bottom of the body tube 28. The image receiving unit 43 is an aggregate of a multiple of pixels disposed on a plane, e.g. a CCD. The position of each pixel is specified around the transmission light optical axis 32*a*. To specify the position of each pixel, X-Y coordinates with the optical axis as its origin is assumed, and the position of each pixel is specified by X-coordinate and Y-coordinate.

Further, an angle of a light beam entering the image receiving unit 43 is determined by the position of each pixel on the image receiving unit 43, and it is represented as a field angle (angle of view).

The elevation rotary mirror 35, the condenser lens 34, the image receiving unit 43, etc. make up together the image pickup unit 5.

An image pickup light from the object to be measured is entered to the elevation rotary mirror 35 along an image pickup light optical axis 44, which concurs with the projection light optical axis 36. After being reflected by the elevation rotary mirror 35, the image pickup light passes through the condenser lens 34 and the beam splitter 74 and is received by the image receiving unit 43, and an image is acquired.

Next, description will be given on the rotary projecting unit 8.

An upper casing 41 is mounted on an upper portion of the main unit casing 27, and a part of a side wall of the upper casing 41 is designed as a light projecting window 42. The rotary projecting unit 8 is accommodated within the upper casing 41.

On an upper end of the flange 29, a mirror holder 47 is mounted. The elevation rotary mirror 35 is rotatably mounted on the mirror holder 47 via a rotation shaft 48. An elevation rotary gear 51 is engaged on one of shaft ends of the elevation rotary mirror 35, and an elevation angle detector 52 is provided on the other of the shaft ends of the elevation rotary mirror 35. The elevation angle detector 52 detects a rotation angle (rotating position) of the elevation rotary mirror 35, and the result of detection is sent to the control unit 6.

An elevation rotating motor 53 is mounted on the mirror holder 47. An elevation rotary driving gear 54 is engaged on an output shaft of the elevation rotating motor 53, and the elevation rotary driving gear 54 is engaged with the elevation rotary gear 51. The driving of the elevation rotating motor 53 is controlled by the control unit 6 based on the result of detection by the elevation angle detector 52. The control unit 6 can drive and control the horizontal rotating motor 20 and the elevation rotating motor 53 independently or in synchronization.

On an upper surface of the upper casing 41, a sight (foresight/backsight) 46 is mounted. A collimating direction of the sight 46 perpendicularly crosses the emission light optical axis 32 and runs perpendicularly to the rotation shaft 48.

Figure 3:
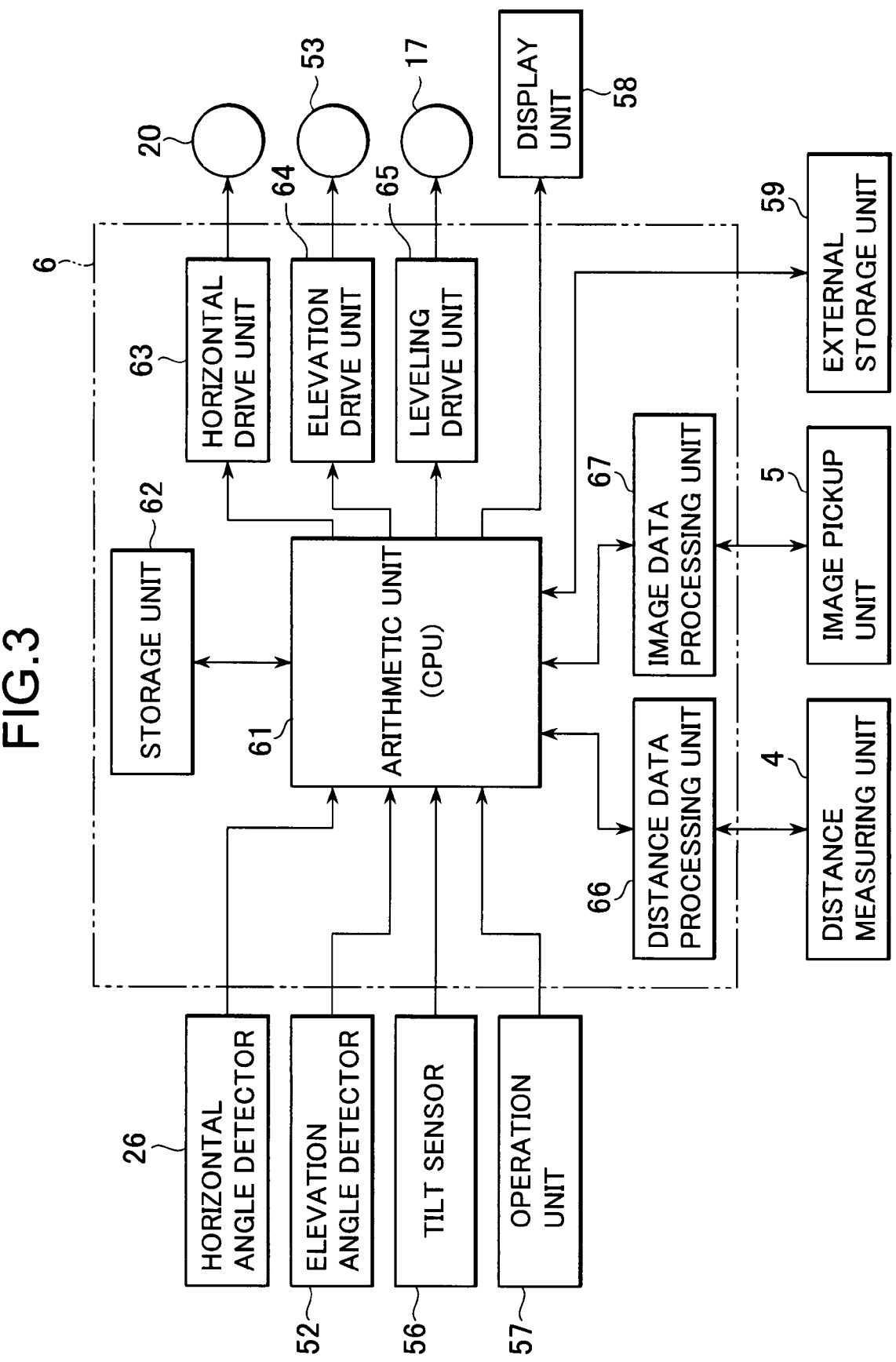
FIG. 3 is a block diagram of the position measuring system to show the arrangement of the position measuring system of the first embodiment of the invention.

Referring to FIG. 3, description will be given now on an arrangement of a control system of the position measuring system 1.

Detection signals from the horizontal angle detector 26, the elevation angle detector 52, and the tilt sensor 56 are inputted to the control unit 6, and it is so designed that the conditions necessary for starting the measurement of the position measuring system 1 and an instruction to start the measurement or the like can be inputted to the control unit 6 by a measurement operator from an operation unit 57. The operation unit 57 may be provided on a casing such as the main unit casing 27 or the like or may be provided independently and may be remotely controlled via a signal transmitting means such as wireless means or infrared light.

The control unit 6 drives the horizontal rotating motor 20, the elevation rotating motor 53 and the leveling motor 17 and the control unit 6 also drives a display unit 58, which displays operating conditions, measurement results, etc. An external storage unit 59 such as a memory card, a HDD, etc. may be disposed on the control unit 6 or may be removably provided on it.

Next, general features of the control unit 6 will be described.

The control unit 6 comprises an arithmetic unit 61 typically represented by a CPU, and a storage unit 62 for storing various programs and the data such as measurement data, image data, etc. These programs include: a sequence program and a computation program which are necessary for measuring a distance and detecting an elevation angle and a horizontal angle, a measured data processing program for performing the processing of the measurement data, an image processing program for processing the image, an image display program for displaying the data on the display unit 58, and a program for coordination and management of these programs. The control unit 6 further comprises a horizontal drive unit 63 for driving and controlling the horizontal rotating motor 20, an elevation drive unit 64 for driving and controlling the elevation rotating motor 53, a leveling drive unit 65 for driving and controlling the leveling motor 17, a distance data processing unit 66 for processing distance data obtained by the distance measuring unit 4, an image data processing unit 67 for processing image obtained by the image pickup unit 5, and so on.

The functions of the distance data processing unit 66 and the image data processing unit 67 may be executed by the arithmetic unit 61. In such case, the distance data processing unit 66 and the image data processing unit 67 need not be used. By separately providing the distance data processing unit 66 and the image data processing unit 67, the distance data processing and the image data processing can be executed in parallel, and this contributes to the accomplishment of the processing at higher speed.

The distance data processing unit 66 and the image data processing unit 67 may be provided separately. For instance, a personal computer (PC) may be prepared separately, and the functions of the distance data processing unit 66 and the image data processing unit 67 may be executed by the PC. In this case, the distance data and the image data may be stored in the external storage unit 59. After storing the data, the external storage unit 59 can be removed from the control unit 6 and connected to the PC, and the distance data processing and the image data processing may be executed by the PC. It is also possible to transmit the data acquired by the position measuring system 1 to the PC via communication means as required such as wireless LAN, etc. In this case, there is no need to removably provide the external storage unit 59 or the external storage unit 59 may not be used.

Figure 4:
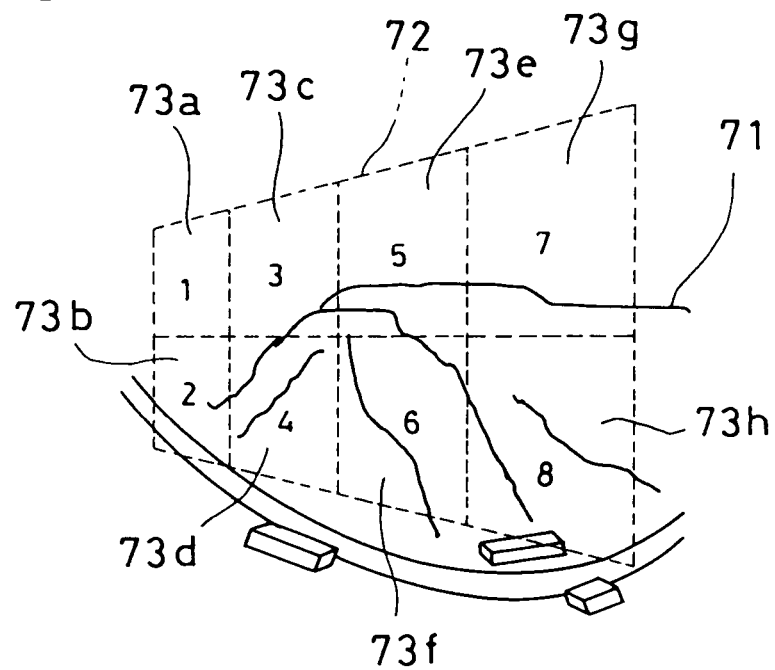
FIG. 4 is a schematical drawing to explain data acquisition in the first embodiment.
Figure 5:
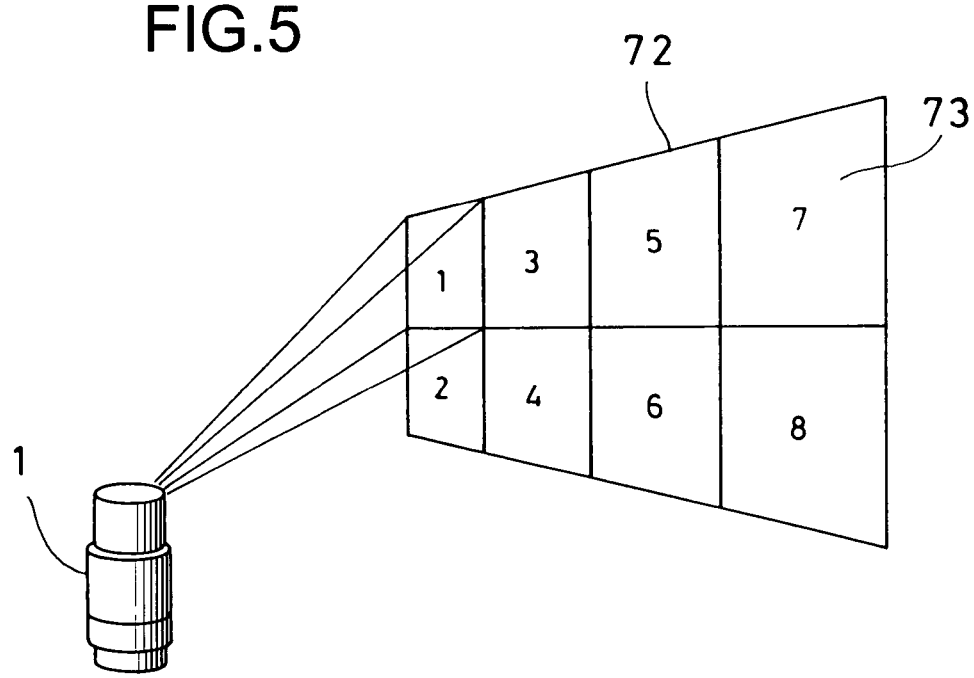
FIG. 5 is a schematical drawing to explain data acquisition in the first embodiment.
Figure 6:
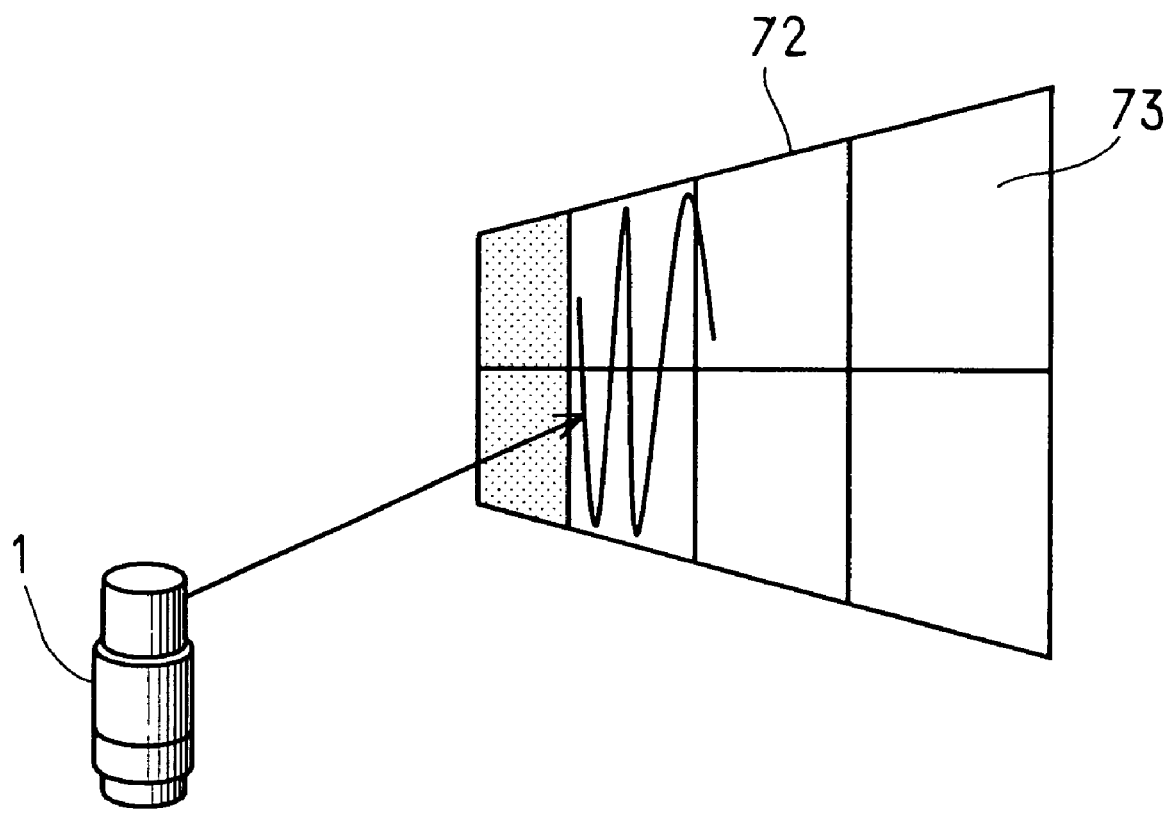
FIG. 6 is a schematical drawing to explain data acquisition in the first embodiment.
Figure 7:
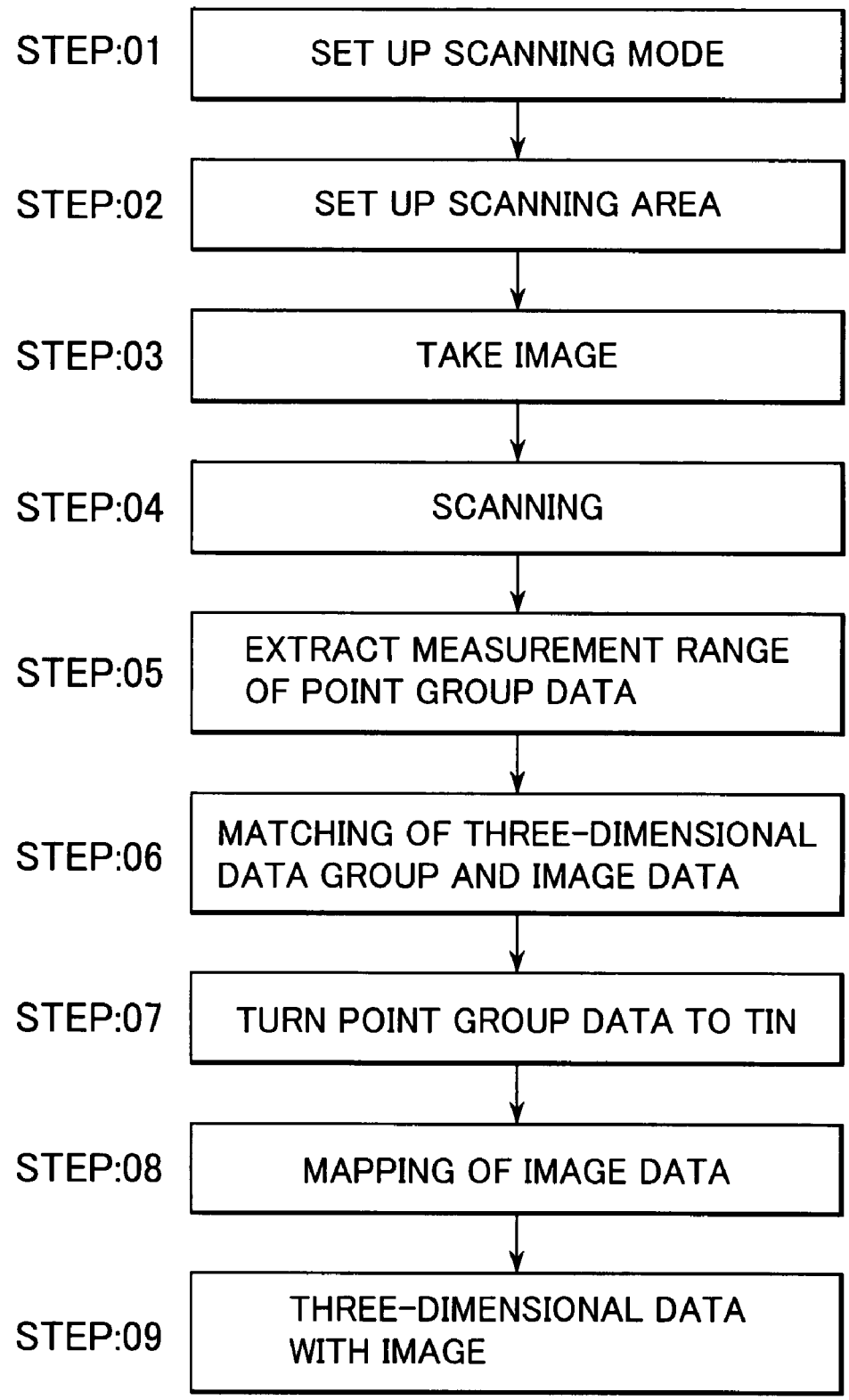
FIG. 7 is a flow chart to show flow of operation to prepare three-dimensional data with an image in the first embodiment.
Figure 8:
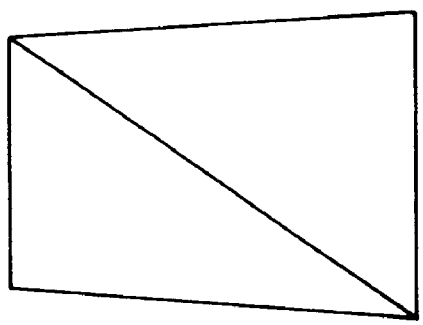
FIG. 8(A), FIG. 8(B), FIG. 8(C) and FIG. 8(D) each represents an aspect to turn a point group data to TIN in the first embodiment.
Figure 8:
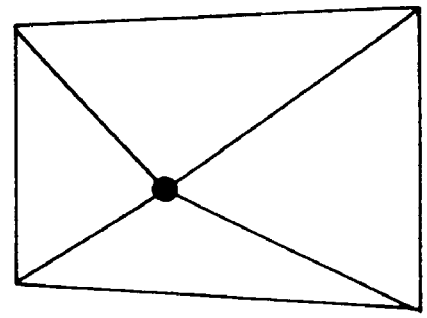
Figure 8:
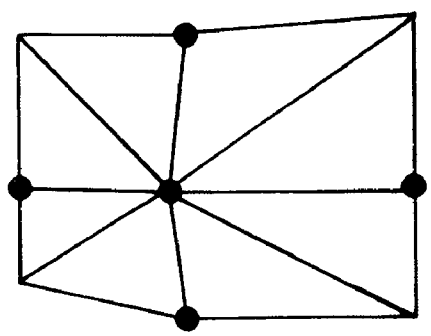
Figure 8:
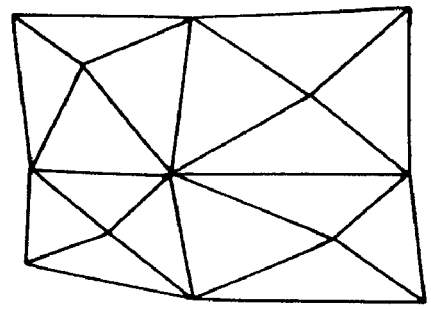
Figure 9:
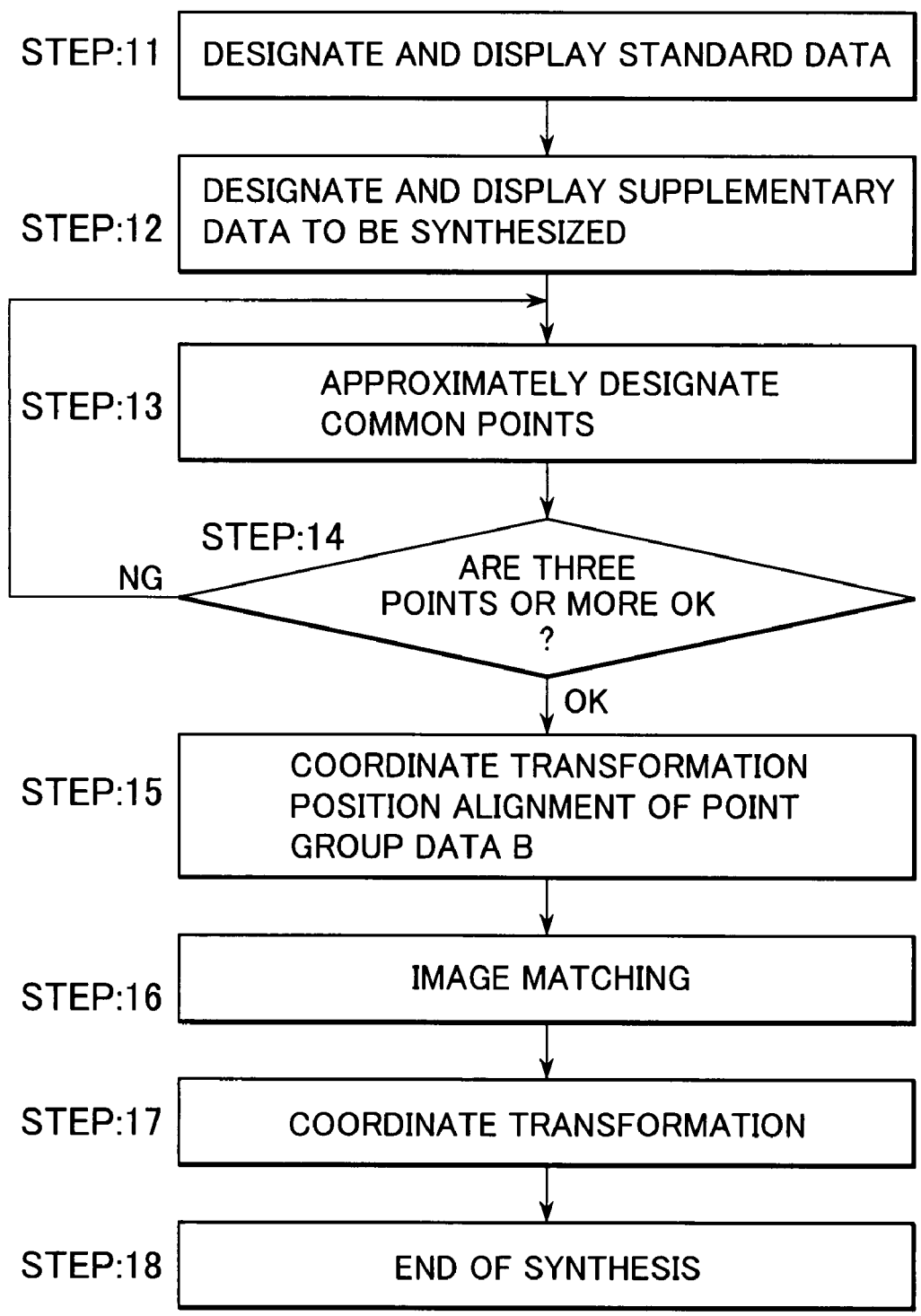
FIG. 9 is a flow chart to show flow of operation to prepare three-dimensional data with an image in the first embodiment.
Figure 10:
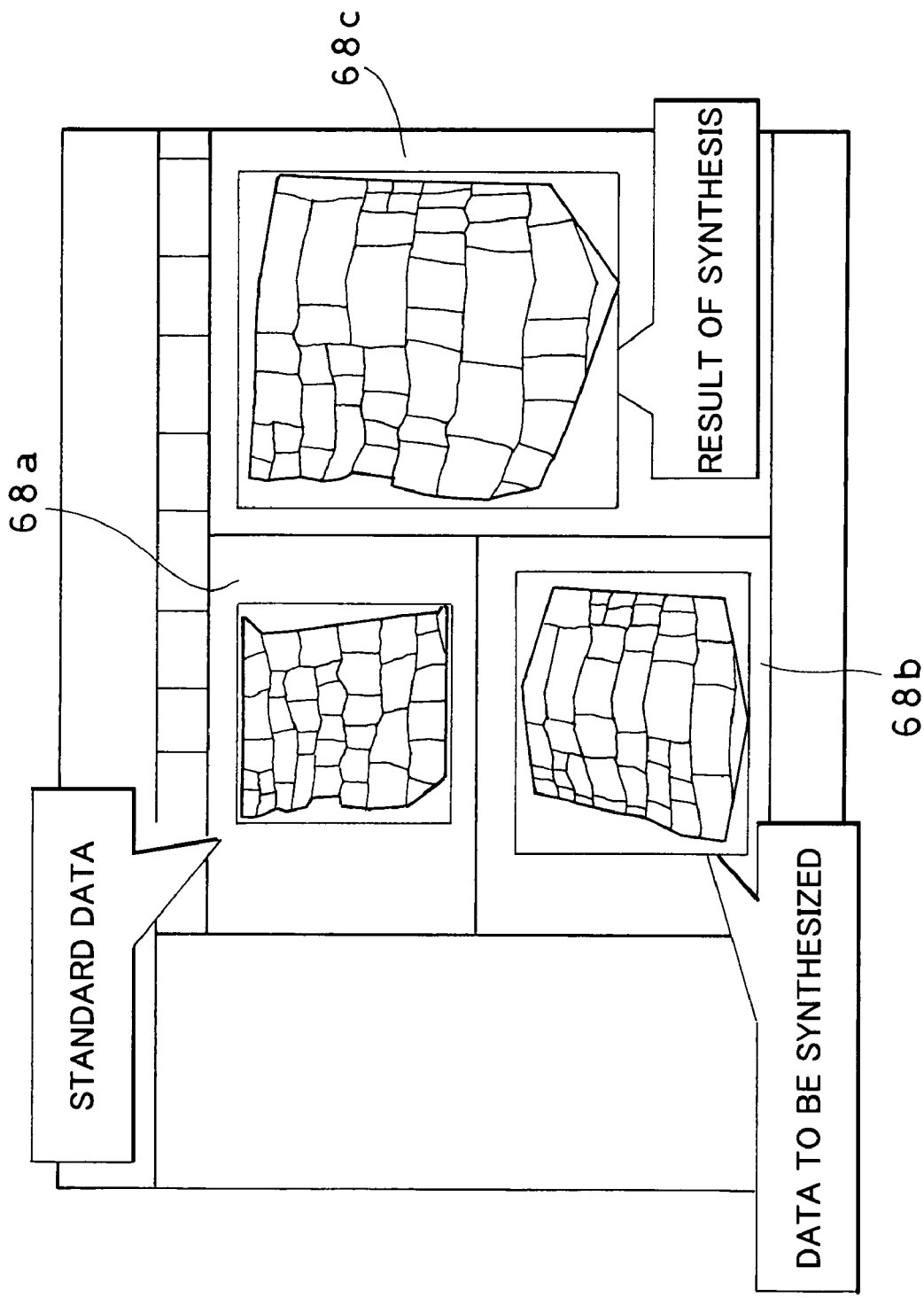
FIG. 10 is a drawing to show conditions of windows displayed on a display unit in the first embodiment of the invention.

Next, description will be given on measurement operation and on the acquisition of image data and distance measurement data by the position measuring system 1, referring to FIG. 4 to FIG. 6.

The position measuring system 1 is installed at a known point. Leveling is instructed from the operation unit 57, and leveling is performed.

The leveling motor 17 is driven by the leveling drive unit 65. Tilting of the position measuring system 1 is detected by the tilt sensor 56, and the result of detection by the tilt sensor 56 is fed back to the control unit 6. The adjusting screws 14 are rotated by the leveling motors 17 so that the tilt sensor 56 can detects horizontal position.

When leveling operation is completed, the completion of the leveling is displayed on the display unit 58 or is announced by means such as alarm sound, etc.

When the leveling operation is completed, collimation is performed by using the sight 46. The position measuring system 1 is directed in a measuring direction. Further, a measurement area 72 is set up.

An image of the measurement area 72 is picked up. If the measurement area 72 is spreading beyond the range of a single image pickup, the image is taken by dividing the area (divided in 8 portions in the figure). When the images are taken by dividing the area, the images should be taken so that the required portions are overlapped on each other between adjacent images thus taken in order that the image data taken from the divided images can be easily connected with each other.

By setting up the measurement area 72 and also by setting the range of a single image pickup and the extent of overlapping, the arithmetic unit 61 calculates the conditions necessary to take images by dividing the area. For instance, calculation is made on the number of divisions of the area to take images, a rotation angle to rotate the measuring system main unit 7 for each image-taking operation, an image-taking direction of the measuring system main unit 7, a rotation angle of the elevation rotary mirror 35, an elevation angle of the elevation rotary mirror 35, etc.

The execution of the image pickup is instructed from the operation unit 57.

The posture of the elevation rotary mirror 35 is set up so that reflection surface of the elevation rotary mirror 35 faces to the image receiving unit 43, and the horizontal rotating motor 20 and the elevation rotating motor 53 are driven. The measuring system main unit 7 is rotated in a horizontal direction, and the elevation rotary mirror 35 is rotated in an elevation (high-low) direction.

The horizontal angle detected by the horizontal angle detector 26 and the elevation angle detected by the elevation angle detector 52 are fed back to the control unit 6, and it is controlled in such manner that the projection light optical axis 36 concurs with the horizontal angle and the elevation angle in the direction of the divided image pickup areas (hereinafter referred as "divided areas" 73*a*-73*h*).

Under the condition that the horizontal angle and the elevation angle thus calculated concur with the horizontal angle and the elevation angle detected by the horizontal angle detector 26 and the elevation angle detector 52 respectively, images are taken on each of the divided areas 73*a*-73*h* by the image receiving unit 43.

The photodetection signals from the image receiving unit 43 are stored in the storage unit 62 as digital image data of the images corresponding to the divided areas 73*a*-73*h*.

The digital image data is an aggregate of signals of each pixel on the image receiving unit 43, and the signal of each pixel has a signal, which specifies and determines a position (coordinate position) in the image receiving unit 43. Also, the position in the image receiving unit 43 is specified and identified with respect to the image pickup optical axis 44. Further, the horizontal angle and the elevation angle of the image pickup optical axis 44 for each image are the values detected by the horizontal angle detector 26 and the elevation angle detector 52 respectively, and these are known values. Therefore, the positions of all images in the measurement area 72 are already known, and positions of all pixels of each image in the measurement area 72 are also known values. The image data to be stored in the storage unit 62 includes horizontal angle data and elevation angle data (address data) for each pixel.

When the image pickup of the measurement area 72 is completed, by connecting(joining) the image data of each of the divided areas, an interconnected image (a joined image) including the measurement area 72 can be obtained. On the interconnected image, the measurement area 72 is newly set up, and the execution of distance measurement of the measurement area 72 is instructed from the operation unit 57.

The posture of the elevation rotary mirror 35 is set up so that the reflection surface of the elevation rotary mirror 35 faces toward the light emitting element 31. The horizontal rotating motor 20 and the elevation rotating motor 53 are driven. The measuring system main unit 7 is rotated in a horizontal direction, and the elevation rotary mirror 35 is rotated in an elevation (high-low) direction.

From the light emitting element 31, a distance measuring light is emitted as a pulsed beam. The distance measuring light passes through the aperture of the aperture mirror 33 and is deflected by the elevation rotary mirror 35 and is then projected along the projection light optical axis 36. Under the condition that the distance measuring light is emitted as a pulsed beam, the horizontal rotating motor 20 and the elevation rotating motor 53 are driven in synchronization. The measuring system main unit 7 is rotated in a horizontal direction and the elevation rotary mirror 35 is rotated in an elevation (high-low) direction. Then, by a distance measuring light 37 emitted with pulses (hereinafter referred as "pulsed distance measuring light 37"), the measurement area 72 (laser scanning).

The distance measuring light reflected by an object to be measured 71 is deflected on the direction of the emission light optical axis 32 by the elevation rotary mirror 35. The distance measuring light is then reflected by the aperture mirror 33 and is received by the distance measuring light receiving unit 39. At the distance measuring unit 4, distance measurement is made for each pulse based on the reflected distance measuring light.

Thus, distance data determined for each pulse is acquired. Also, the horizontal angle detected by the horizontal angle detector 26 and the elevation angle detected by the elevation angle detector 52 when the pulsed light beam is projected are acquired at the same time. Each distance measurement data is interrelated and associated with the elevation angle data and the horizontal angle data and are stored in the storage unit 62. The horizontal angle relating to each pixel is equally corresponded with the horizontal angle relating to distance measurement data, and the relation between the elevation angle relating to each pixel and the elevation angle relating to distance measurement data is given as: (Pixel elevation angle—90°)=distance data elevation angle).

In this case, the number of the distance data acquired is in the range of several millions to several tens of millions although it varies depending on the extension of the measurement area. By interrelating and associating the distance data thus acquired with the elevation angle data and the horizontal angle data, three-dimensional data for each measuring point can be obtained. Further, many point data included in the measurement area 72, i.e. three-dimensional data group (point group data), can be acquired.

The distance measuring unit 4 and the image pickup unit 5 are integrally provided on the measuring system main unit 7. The image is taken and the distance is measured on the same optical axis, and the distance measuring unit 4 and the image pickup unit 5 are integrally moved in a horizontal rotation by the rotary mechanism 3. As a result, no positional deviation occurs due to the rotation between the point group data and the image data. The horizontal angle data and the elevation angle data for each pixel of the image data show a corresponding relation of (1:1) with the elevation angle data and the horizontal angle data associated with the distance data at each point of the point group data. Thus, good interrelating and associating can be made between the distance data and the image data according to the elevation angle data and the horizontal angle data.

When scanning over the entire measurement area 72 is completed by the distance measuring light 37, the acquisition of the image data and the three-dimensional data group (point group data) is completed.

Further, by referring to FIG. 7 to FIG. 16, description will be given below on the processing to prepare the three-dimensional data with an image.

(Step 01) After the installation of the position measuring system 1 at a known point (e.g. at Point A) has been completed, scanning mode is set up. The scanning mode is conditions for the execution of laser scanning, and a scanning pitch, a beam diameter of the distance measuring light 37, scanning point, etc. are included in this condition.

(Step 02) The scanning area (the measurement area 72) is set up. The measurement area 72 is set up on a screen displayed on the display unit 58 by using a horizontal angle H and a vertical angle V. For instance, the measurement area 72 in rectangular shape can be set up by setting (horizontal angle H1; vertical angle V1), (horizontal angle H2; vertical angle V2), (horizontal angle H3; vertical angle V3), and (horizontal angle H4; vertical angle V4) at four corners of the rectangle.

The measurement area 72 may be set up by observing through the sight 46.

(Step 03) An image of the measurement area 72 is taken. If the measurement area 72 spreads beyond the range of a single image pickup, the images are taken by dividing the area. When the images are taken by dividing the area, image pickup is performed in such manner that the required portions are overlapped on each other between the adjacent pickup images as described above. The images thus taken (hereinafter referred as "divided images") can be interconnected (joined) with each other by superimposing the overlapping portions, and the images are displayed on the display unit 58 as a panoramic image. On the panoramic image, the measurement area 72 is set up.

(Step 04) The range of the measurement area 72 thus set up is scanned by laser scanning and measurement is made. For executing the measurement, the pulsed distance measuring light scans the range thus set up within the measurement area 72 as described above, and distance measurement is performed for each pulsed beam. Thus, and distance data is acquired for each pulse. Also, the elevation angle and the horizontal angle for each pulse are detected by the horizontal angle detector 26 and the elevation angle detector 52 respectively. The results of detection are incorporated from the horizontal angle detector 26 and the elevation angle detector 52. The results of detection are interrelated and associated with each other for each distance data and are stored in the storage unit 62. Specifically, for each point (measuring point) where the pulsed beam is projected, three-dimensional measurement is performed, and the result of the measurement is stored in the storage unit 62 as point group data.

(Step 05) The point group data in the measurement area 72 which are set up in detail on the image are extracted.

(Step 06) The field angle of each pixel of the image data with respect to the image pickup optical axis 44 is already known. Because the elevation angle of the image pickup optical axis 44 concurs with the elevation angle in the image pickup direction, the elevation angle of each pixel can be obtained by calculation. Therefore, the interrelating and the associating of the image data with the three-dimensional data group can be made based on the elevation angle of the measuring point and the elevation angle of pixel. The image pickup optical axis of the image pickup unit 5 is concurred with the distance measuring light optical axis of the distance measuring unit 4, and the distance measuring unit 4 and the image pickup unit 5 are integrally rotated in a horizontal direction. Therefore, no deviation occurs in the positional relation between the image data and the three-dimensional data group. In the interrelating and the associating of the image data with the three-dimensional group, there is no need to perform image processing such as optical axis alignment, rotation of the image, etc. Also, there is no need to set up a reference point or the like separately on the object to be measured, and also no need to extract the corresponding reference point from the image. Further, because there is no need to extract the reference point from the image, no error is involved, which may occur at the time of extraction.

(Step 07) As described above, the number of data in the point group data is in the range of several millions to several tens of millions. For this reason, the point group data is turned to TIN (turned to undefined triangulation net; turned to polygonal meshes), and the burden on the arithmetic unit 61 is reduced by data compression and data omission.

The undefined triangulation net is formed by a triangle, which has three-dimensional data as three vertexes. Depending on whether the three-dimensional data to be selected as vertexes are coarsely selected or finely selected, the size of the undefined triangle differs in size. FIG. 8(A) shows a case where the three-dimensional data is coarsely selected, and FIG. 8(D) represents a case where the three-dimensional data is finely selected. FIG. 8(B) to FIG. 8(C) each represents a case somewhere in-between.

By turning to TIN, an undefined triangular surface having three-dimensional data is formed, and point data included in the undefined triangular surface can be eliminated (i.e. the data is compressed).

By preparing several patterns when the data is turned to TIN, the aspect of the processing can be selected depending on the circumstances, i.e. an aspect where high-speed processing can be achieved by increasing the data compression ratio, an aspect where fine and precise processing is performed by reducing the data compression ratio, etc. can be selected.

(Step 08) The point group data turned to TIN are interrelated and associated with the image data, and synthesis (texture mapping) of the point group data and the image data is conducted. In this case, the elevation angle and the horizontal angle of the data for vertexes of the undefined triangle when the data is turned to TIN are already acquired. Also, the elevation angle and the horizontal angle of each pixel in the image data are already known according to the field angle. Further, image pickup and distance measurement are performed on a common projection light optical axis 36. With respect to the vertexes of the undefined triangle, the pixel in the image data can be readily identified based on the elevation angle and the horizontal angle, and the texture mapping of the point group data and the image data can be easily conducted.

(Step 09) Three-dimensional data with the image is prepared by interrelating and associating the point group data with the image data and by synthesis. The three-dimensional data with an image thus prepared is stored in the storage unit 62.

Also, it may be so designed that by changing the measurement area 72, the three-dimensional data with the image may be prepared, and a plurality of three-dimensional data with the image prepared on a plurality of measurement areas 72 may be stored in the storage unit 62.

Next, description will be given on a case where three-dimensional data with a stereoscopic image is prepared by the position measuring system 1. To prepare the three-dimensional data with a stereoscopic image, the position measuring system 1 is installed at another known point, e.g. at Point B. Then, in the similar manner to the procedures of Step 01 to Step 09 as described above, and the three-dimensional data with an image from the direction of Point B is prepared on the measurement area 72. It may be so arranged that the three-dimensional data with an image is prepared by performing the measurement from three or more directions, and that this is stored in the storage unit 62.

Description will be given below on the synthesis of the three-dimensional data with an image (standard data) from the direction of Point A and the three-dimensional data with an image from the direction of Point B (supplementary data for synthesis) by referring to FIG. 9 to FIG. 16.

The operation unit 57 is operated, and an image processing program for preparing the three-dimensional data with a stereoscopic image is started. When the image processing program is started, the screen of the display unit 58 comprises a window 68a, a window 68b, and a window 68c. For instance, the standard data is displayed on the window 68a, the supplementary data is displayed on the window 68b, and the synthetic data is displayed on the window 68c.

The window 68a, the window 68b, and the window 68c can be enlarged or reduced in size independently, and the point group data with an image is displayed on the window 68.

(Step 11) By designating the standard data, the standard data is displayed on the window 68a. The coordinate system of the standard data is regarded as standard, and the standard data and the supplementary data are synthesized.

(Step 12) By designating the supplementary data, the supplementary data is displayed on the window 68b.

(Step 13) In each of the images on the window 68a and the window 68b, at least three points, i.e. the portions displayed in common are approximately designated. The points are designated by an operator by selecting characteristic sites in the images, e.g. a corner, an intersection, etc., and by designating the sites by means of a mouse, a touch pen, etc.

(Step 14 and Step 15) When the designation of three points or more is confirmed, in order to match the coordinate system of the standard data with the coordinate system of the supplementary data, by using the coordinate system of the standard data as the standard, coordinate transformation is performed only on the supplementary data according to orthogonal transformation formula (1) as given below:

$$(X, Y, Z) = R \cdot (x, y, z) + (X0, Y0, Z0) \tag{1}$$

where (X, Y, Z): Coordinates of point group of the standard data
(x, y, z): Coordinates of point group of the supplementary data
transformation parameters are:
R: rotation matrix ($\omega$, $\phi$, $\kappa$) Parallel displacement (X0, Y0, Z0)

In the case the designated points are 4 points or more, the solution is obtained by the least squares matching method, and the residual of (X, Y, Z) between the point group of the standard data and the point group of supplementary data is calculated.

FIG. 12(B) shows an image when the coordinates are transformed and rotation and parallel displacement are corrected.

In the above, description has been given on an example where coordinate transformation is performed between two three-dimensional data with image as seen from two directions, i.e. from the direction A and the direction B. In case a multiple of three-dimensional data (A1, A2, A3, . . . Ai) are obtained by shifting at a certain angle each time over the total periphery of the measurement area, image transformation is sequentially performed between the two three-dimensional data in adjacent directions, i.e. between "A1 and A2", "A2 and A3", . . . "Ai-1 and Ai", "Ai and A1", by regarding the points in common as constraint points (standard points). Based on the result, transformation coefficient for all is adjusted. By the transformation coefficient thus adjusted, final coordinate transformation is carried out. Then, coordinate transformation with higher accuracy can be carried out.

(Step 16) Matching is performed between the image of the standard data and the image of the supplementary data. Using the points designated in Step 13 and the image obtained by coordinate transformation of Step 15, the matching is performed between the image of the standard data and the image of the supplementary data, and the accurate positions of the points designated in Step 13 are obtained. The image matching is conducted by using gray scale information of the image of the standard data and the image of the supplementary data.

In the case the matching of the standard data with the supplementary data is performed, a predetermined shape, e.g. a square template 69$a$, is set up on the standard data with the center at the approximate position of the point designated in Step 13, and a search area 69$b$ is set up with the center at the approximate position of the point designated in Step 13 on the supplementary data. The search area 69$b$ is larger than the template 69$a$. For instance, the search area 69$b$ is about two times as large as the template 69$a$. A template 69$a'$, which is set in the same size as the template 69$a$, is moved within the search area 69$b$, and the position of the template 69$a'$ is searched, where a density value of the template 69$a'$ closest to the density value of the template 69$a$.

In the coordinate transformation of Step 15, the image of the standard data approximately agrees with the image of the supplementary data in scale and tilting. Thus, the search result can be obtained with high accuracy.

Here, the least squares matching (LSM) is further used, which is an effective matching method for the shape with irregular surfaces of an object and distortion of projection, and the matching is performed with high accuracy between the images.

Figure 15:
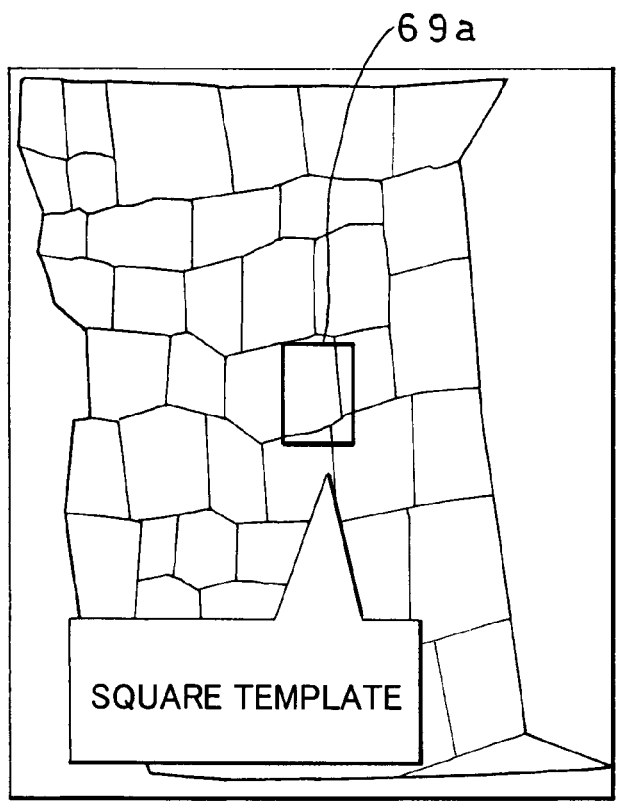
FIG. 15(A) and FIG. 15(B) each represents a drawing to show an example of an image to be displayed on the display unit.
Figure 15:
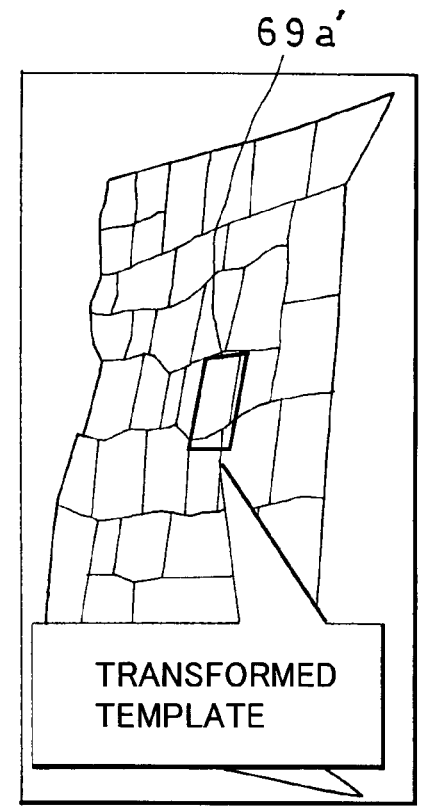

As shown in FIG. 14 and FIG. 15, the least squares matching is a method by which matching is performed by affine transformation of the shape of the template 69$a$ to the shape of the template 69$a'$, and the corresponding points are measured in sub-pixel unit.

It is supposed here that the template 69$a$ when patterns are compared is represented by f1 (i, j), and the transformed template 69$a'$ is represented by f2 (x, y), and the transformation of the template 69$a'$ is approximated by the affine transformation according to the following equations:

$$x = a1i + a2j + a3;\ y = a4i + a5j + a6 \quad (2)$$

Density difference in the pixels compared individually is given by the following equation:

$$d(i, j) = f1(i, j) - f2(x, y)$$
$$= f1(i, j) - f2(a1i + a2j + a3, a4i + a5j + a6)$$

Figure 16:
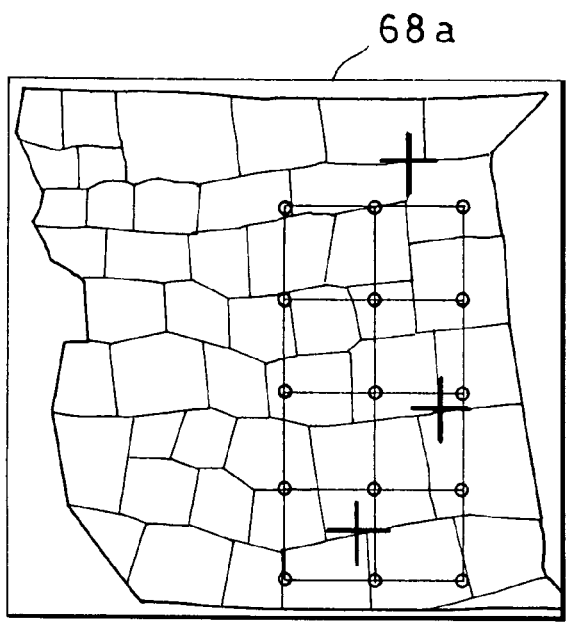
FIG. 16(A) and FIG. 16(B) each represents a drawing to show an example of an image to be displayed on the display unit.
Figure 16:
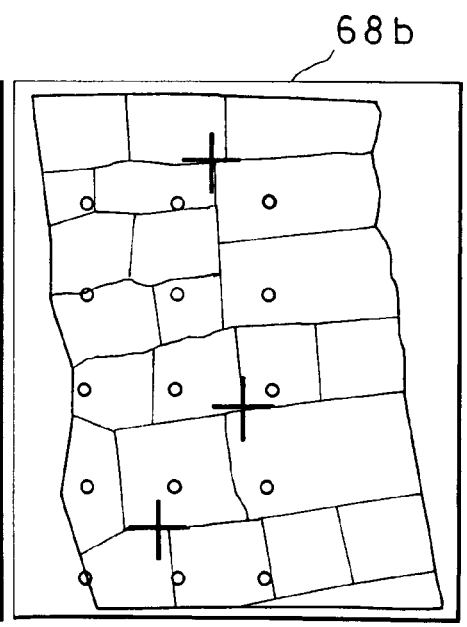

Next, the values of a1 to a6 are determined, which satisfy the condition where square sum of density difference is the minimum (i.e. the condition of $\Sigma d(i,j)^2 \rightarrow$ min.) where a1, a2, a4 and a5 represent transformation of the template 69$a'$ respectively, and a3 and a6 represent the coordinates of the detected position to be determined respectively, and the position with sub-pixel high accuracy can be detected. Normally, these transformation parameters are handled in the process of the matching. Here, the parameters are handled on the image mapped on the point group data, and the transformation of the template 69$a'$ can be easily estimated. Therefore, by finding the parameters from the transformation to perform the matching, the matching can be performed quickly and with high accuracy. Also, as shown in FIG. 16, not only by the approximate points, but also by using the characteristics of the image, meshes may be prepared and the matching can be performed on these images.

In the above, description has been given on an example where the matching is performed in the course of affine transformation. When approximate coordinate transformation is carried out in Step 14 in advance as shown in the present embodiment, because the range of affine transformation can be estimated, sufficient accuracy can be maintained through the matching with affine transformation limited to a predetermined range or through the matching by keeping the shape of the template in rectangular shape without performing affine transformation.

(Step 17) By using the coordinates obtained through the matching of Step 16, final coordinate transformation is conducted by using the same equation as in Step 15.

(Step 18) The result of the coordinate transformation of Step 17 is displayed on the window 68$c$, and the result of synthesis is confirmed. Thus, the stereoscopic image with good interrelating and associating with the point group data can be obtained.

As described above, through the matching of the image of the standard data with the image of the supplementary data and by coordinate transformation of the supplementary data to the standard data, the synthesis of the standard point group data and the supplementary pint group data can be conducted. When synthesis is performed between the point group data, it is difficult to set up a common point in the point group data, but the synthesis between the point group data can be easily accomplished through the synthesis via the matching between the images.

In the above, description has been given on an example, in which the matching is performed between two images from two directions, i.e. the direction A and the direction B. When a multiple of three-dimensional data (A, A2, A3, . . . Ai) with images is obtained by deviating at a certain angle each time over the entire periphery, coordinate transformation is performed by the matching of two image data in the directions adjacent to each other. As described above, when coordinate transformation is adjusted for the whole based on the results, it is possible to perform synthesis of the point group data with higher accuracy. In this case, adjustment can be made including standard points separately measured by the means such as a total station.

Next, description will be given on another type of the position measuring system 1, which makes it possible to perform the measurement.

Figure 17:
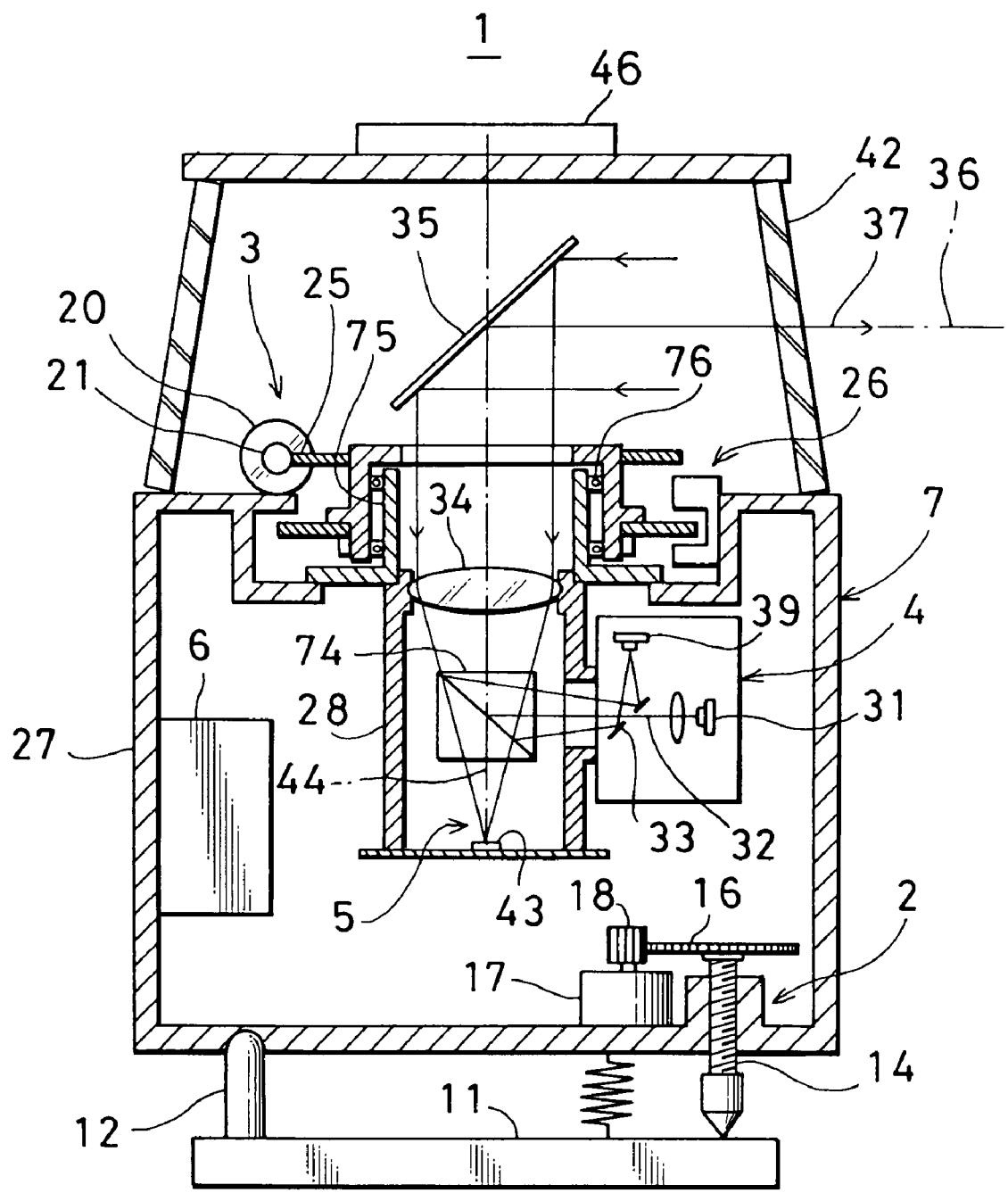
FIG. 17 is a cross-sectional view of a position measuring system according to a second embodiment of the invention.
Figure 18:
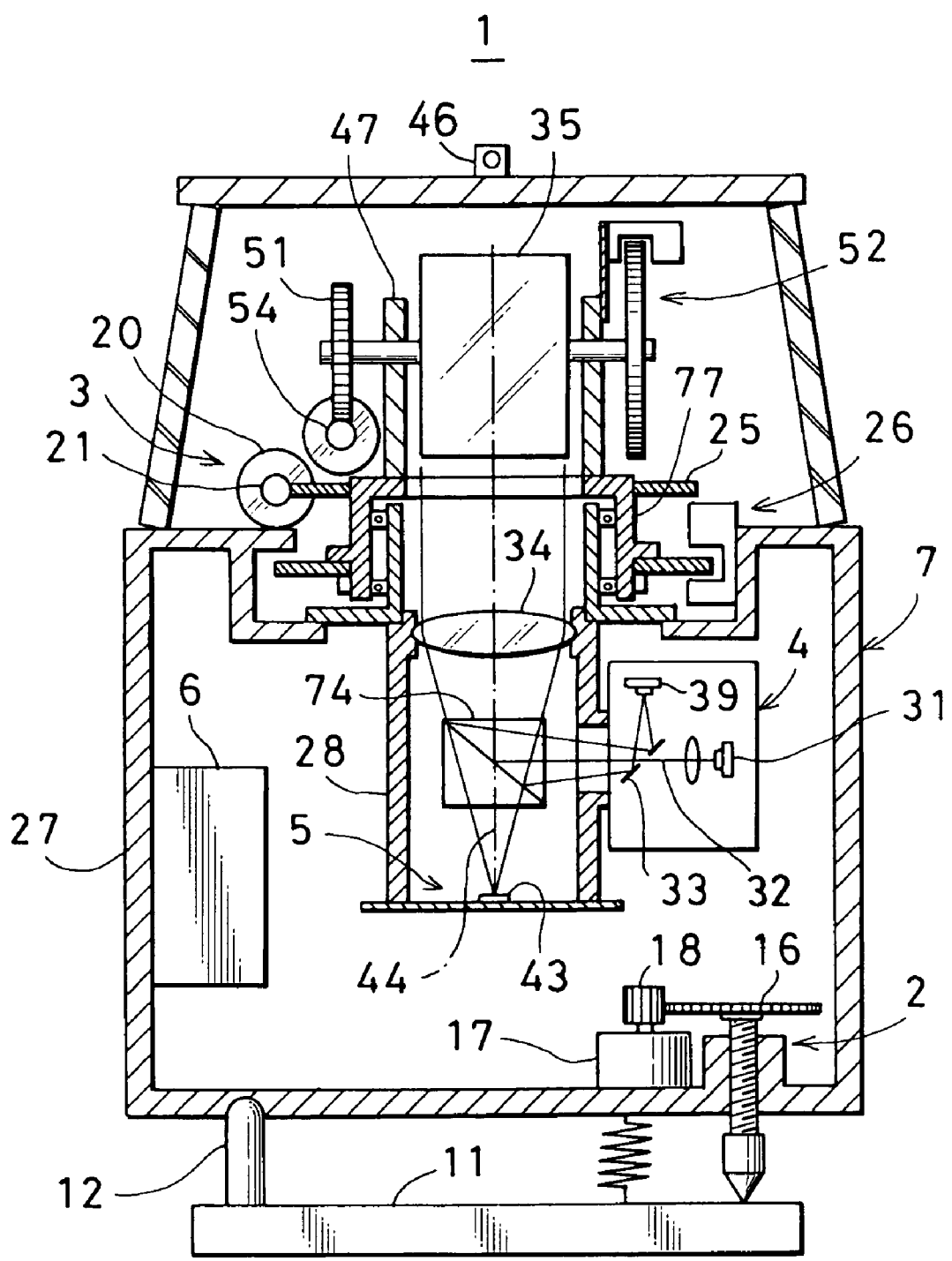
FIG. 18 is a cross-sectional view of a position measuring system according to the second embodiment of the invention with a part of the system being rotated.

FIG. 17 and FIG. 18 each represents the position measuring system 1 in a second embodiment of the invention. The relation between FIG. 17 and FIG. 18 is similar to the relation between FIG. 1 and FIG. 2. In FIG. 17 and FIG. 18, the same component as in FIG. 1 and FIG. 2 are referred by the same symbol and detailed description is not given here.

In the second embodiment, the rotary mechanism 3 used in the first embodiment is simplified. The arrangement that the emission light optical axis 32 and the image pickup optical axis 44 are optically separated from each other, is the same as in the first embodiment. In the second embodiment, also, infrared light is used as the distance measuring light.

An upper end shaft unit 75 to form a part of the body tube 28 is disposed on an upper end of the body tube 28 where an image receiving unit 43, a beam splitter 74, a condenser lens 34, etc. are accommodated, and a rotary base 77 is rotatably mounted on the upper end shaft unit 75 via bearings 76. A mirror holder 47 is mounted on the rotary base 77. An elevation rotary mirror 35 is rotatably disposed on the mirror holder 47. Further, an elevation rotary driving gear 54 to rotate the elevation rotary mirror 35 is mounted, and an elevation angle detector 52 for detecting an elevation angle of the elevation rotary mirror 35 is disposed.

A horizontal rotary gear 25 is mounted on the rotary base 77, and a horizontal rotating motor 20 for rotating the horizontal rotary gear 25 is arranged on an upper surface of a main unit casing 27. A horizontal angle detector 26 for detecting a rotation angle of the rotary base 77 is provided between the rotary base 77 and the main unit casing 27.

In the second embodiment, only the elevation rotary mirror 35 is rotated in an elevation (high-low) direction and is rotated in a horizontal direction. The distance measuring unit 4 and the image pickup unit 5 are fixedly accommodated in the measuring system main unit 7.

In the second embodiment, the image pickup optical axis and the distance measuring light optical axis concur and identical with the projection light optical axis 36. By the rotation of the elevation rotary mirror 35 in an elevation (high-low) direction and in a horizontal direction, surveying operation can be performed within a range as required, and a pickup image in the direction as required can be obtained.

In the second embodiment, the rotary base 77 is rotated, and the images and the photodetecting condition of the reflected distance measuring light are rotated with respect to the image receiving unit 43. The rotation of the images and the rotation of the photodetecting condition of the reflected distance measuring light with respect to the image receiving unit 43 are detected by the horizontal angle detector 26. As a result, image data and distance data are corrected according to the detection angle of the horizontal angle detector 26.

In the second embodiment, the system can be designed in smaller size.

What is claimed is:

1. A position measuring system, comprising a distance measuring unit for projecting and scanning a pulsed beam for measurement to a measurement area and for measuring a distance based on a reflected light of the pulsed beam for measurement and for obtaining a position data group in the measurement area, a digital image pickup unit for acquiring an image data by taking an image of the measurement area, a storage unit for storing at least two sets of position data groups and image data, acquired from at least two directions, by interrelating and associating the position data groups with the image data, and an arithmetic unit for matching two images based on the two sets of stored image data and for synthesizing the at least two position data groups via image matching, and
    wherein said arithmetic unit approximately sets up at least three points or more common to said two image data, and, after performing coordinate transformation on one of the images with reference to the three points or more, matching is performed on said two images, and coordinate transformation is further conducted by using the coordinates obtained by said image matching and
    wherein said arithmetic unit sets up at least three points or more common to the position data groups when two or more position data groups are to be synthesized, performs coordinate transformation by using all of the position data groups with reference to said points, and adjusts the synthesis of total position data groups.

2. A position measuring system according to claim 1, further comprising a sight, wherein said arithmetic unit sets up said measurement area by using said sight, wherein, in the case where the measurement area extends beyond a range of a single image pickup, said arithmetic unit calculates a dividing aspect, picks up divided images two or more times, synthesizes the divided images, and obtains an image of the measurement area.

3. A position measuring system according to claim 1, wherein said arithmetic unit prepares polygonal meshes from said position data group, and the polygonal meshes are interrelated and associated with the image data.

4. A position measuring system according to claim 1, wherein said arithmetic unit approximately sets up three points or more common to said two image data, sets up a template for an area as required including common points in one of the images, sets up a search area which is larger than said template in the other of the images so that the common points are included, and performs image matching by least squares matching method on the images of said template and the image of the search area.

5. A position measuring method, comprising a first step of projecting and scanning a pulsed beam for measurement to a measurement area and obtaining a position data group in the measurement area by performing distance measurement based on a reflected light of the pulsed beam for measurement, a second step of taking an image of said measurement area and acquiring an image data, a third step of storing at least two sets of position data groups and image data, acquired from at least two directions, by interrelating and associating the position data groups with the image data, a fourth step of matching two images based on the two sets of stored image data and synthesizing the two position data groups via image matching, a fifth step of approximately setting up at least three points or more common to the two image data, and, after performing coordinate transformation of one of the images with reference to the three points or more, performing the matching of the two images, and conducting coordinate transformation further by the coordinates obtained by the image matching, wherein, in said coordinate transformation, when two or more position data groups are to be synthesized, at least three points or more common to the position data groups are set up, coordinate transformation is performed by using all of the position data groups with reference to said points, and synthesis of total position data groups is adjusted.

6. A position measuring method according to claim 5, wherein polygonal meshes are prepared from said position data group for the interrelating and the associating of the position data group with the image data, and the polygonal meshes are interrelated and associated with the image data.

7. A position measuring method according to claim 5, further comprising a step of approximately setting up three points or more common to the two image data for the matching, setting a template of an area as required including the common points in one of the images, setting up a search area larger than said template including the common points in the other of the images, and performing image matching by least squares matching method on the image of said template and on the image of said search area.

8. A position measuring program for executing a step of projecting and scanning a pulsed beam for measurement to a measurement area, a step of measuring a distance based on a reflected light of the pulsed beam for measurement, a step of obtaining position data group on the measurement area, a step of acquiring image data by taking an image of the measurement area, a step of storing at least two sets of position data group and image data, acquired from at least two directions, by interrelating and associating the position data group with the image data, a step of matching of two images based on the two sets of stored image data, and a step of synthesizing the two position data groups via image matching, and wherein at least three points or more common to the two image data are approximately set up, and, after performing coordinate transformation on one of the images with reference to the three points or more, matching is performed on the two images, and coordinate transformation is further executed by the coordinates obtained by the image matching, and wherein at least three or more points common to the position data groups are set up in said coordinates transformation when two or more position data groups are to be synthesized, and coordinate transformation is performed by using all of the position data groups with reference to the points, and synthesis of total position data groups is adjusted.

9. A position measuring program according to claim 8, wherein polygonal meshes are prepared from the position data group for the interrelating and the associating of the position data groups with the image data, and the polygonal meshes are interrelated and associated with the image data.

10. A position measuring program according to claim 8, wherein three points or more common to said two image data are approximately set up for the matching, a template of an area as required including the common points is set up in one of the images, a search area larger than said template including the common points is set up in the other of the images, and image matching by least squares matching method is performed on the image of said template and on the image of said search area.

* * * * *

UNITED STATES PATENT AND TRADEMARK OFFICE
CERTIFICATE OF CORRECTION

| | |
|---|---|
| PATENT NO. | : 8,218,131 B2 |
| APPLICATION NO. | : 11/891382 |
| DATED | : July 10, 2012 |
| INVENTOR(S) | : Otani et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1347 days.

Signed and Sealed this
Ninth Day of October, 2012

David J. Kappos
*Director of the United States Patent and Trademark Office*